No. 608,402. Patented Aug. 2, 1898.
H. E. DODSON.
CULTIVATOR.
(Application filed Jan. 8, 1897.)
(No Model.) 3 Sheets—Sheet 1.
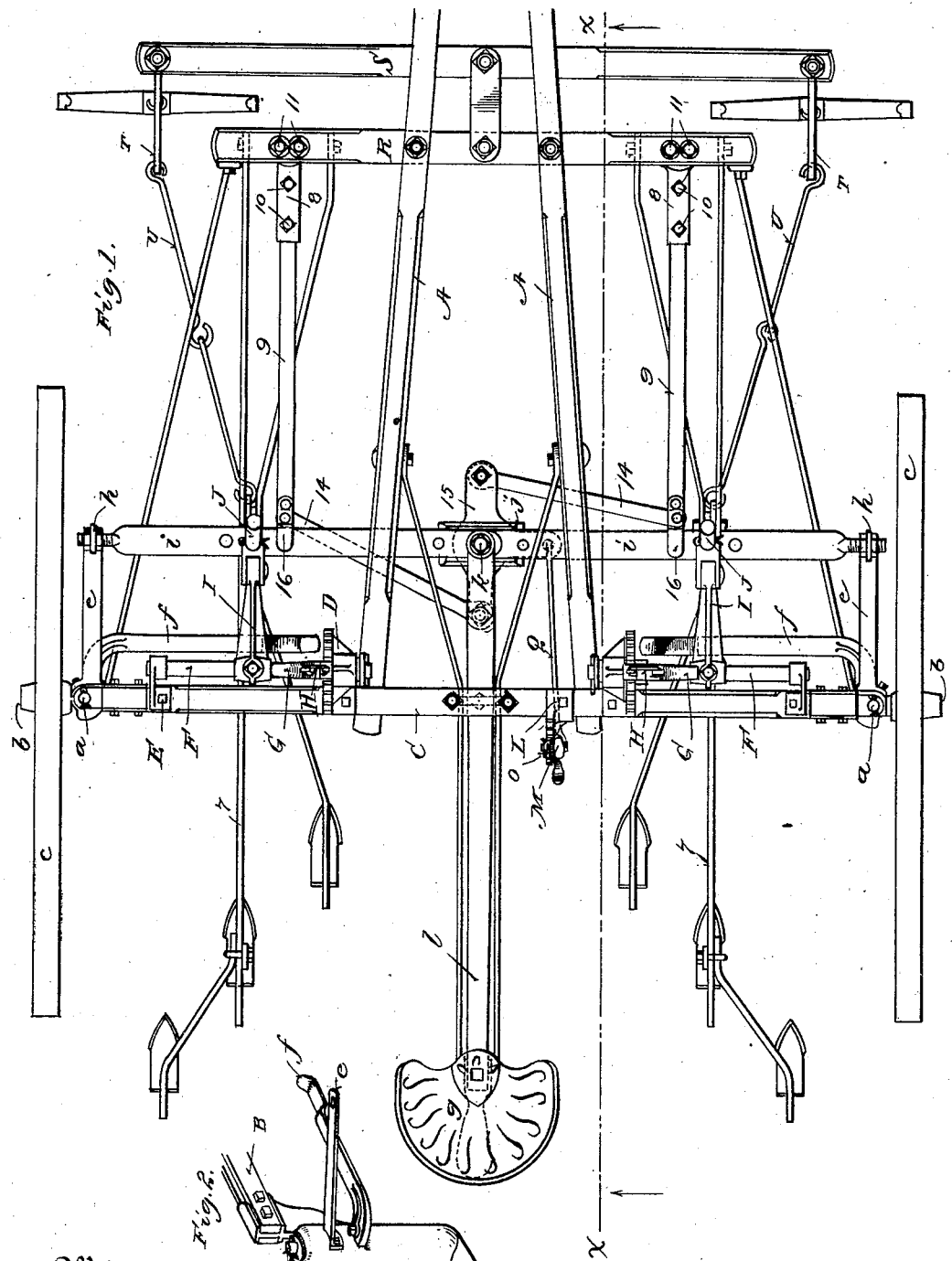

No. 608,402. Patented Aug. 2, 1898.
H. E. DODSON.
CULTIVATOR.
(Application filed Jan. 8, 1897.)
(No Model.) 3 Sheets—Sheet 2.
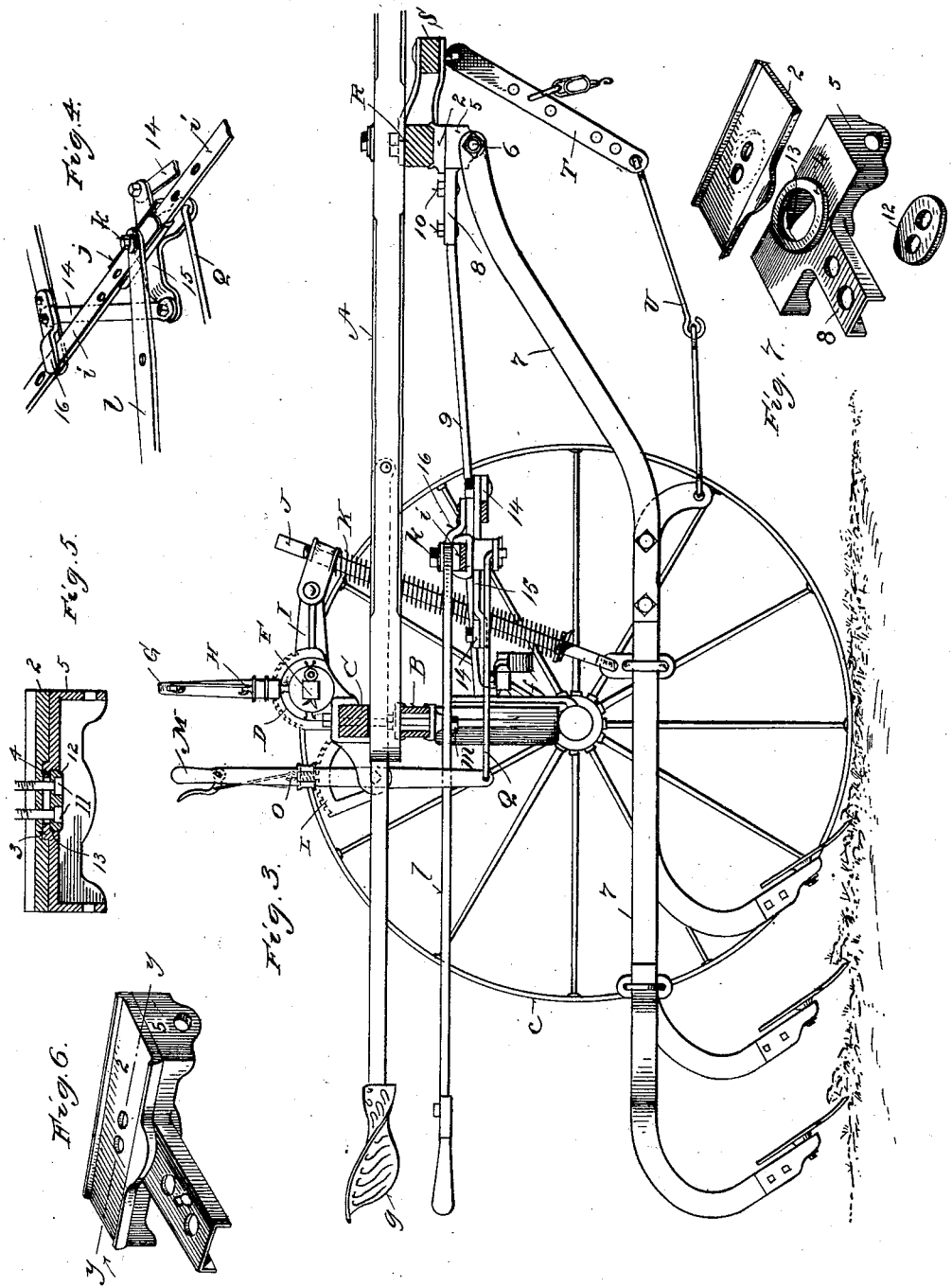
Witnesses
Jas. E. Dawley.
W. M. McNair.
Harry E. Dodson, Inventor
By his Attorney
H. A. Toulmin.

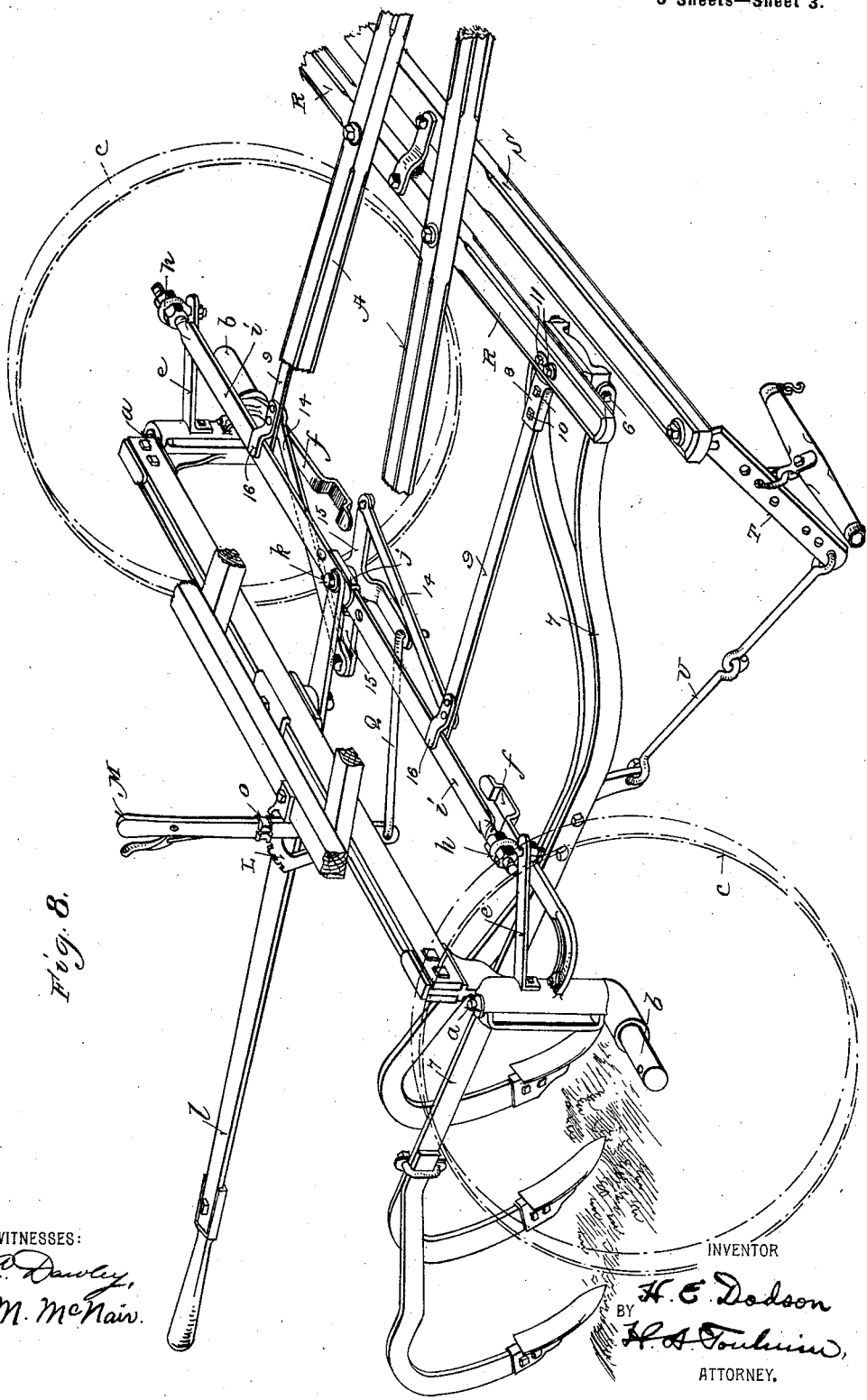

United States Patent Office.

HARRY E. DODSON, OF SPRINGFIELD, OHIO, ASSIGNOR TO THE P. P. MAST & COMPANY, OF SAME PLACE.

CULTIVATOR.

SPECIFICATION forming part of Letters Patent No. 608,402, dated August 2, 1898.

Application filed January 8, 1897. Serial No. 618,425. (No model.)

*To all whom it may concern:*

Be it known that I, HARRY E. DODSON, a citizen of the United States, residing at Springfield, in the county of Clark and State of Ohio, have invented certain new and useful Improvements in Cultivators, of which the following is a specification, reference being had therein to the accompanying drawings.

This invention relates to certain new and useful improvements in cultivators designed particularly for cultivating the soil about growing plants, as corn.

The general object of the invention is to enable the operator while either riding on the machine or walking on the ground behind the machine to shift the cultivating-beams laterally and at the same time turn or deflect the wheels, so that if the beams are moved to the left the body of the machine will run to the left by so deflecting the wheels, or if the beams are moved to the right the general frame of the machine will move to the right by so deflecting the wheels. This object I carry into effect by pivoting the wheel-axles on vertical spindles and by pivoting the forward portions of the cultivating-beams on vertical pivots and by then interconnecting arms on the wheel-spindles by a cross-bar, and connecting levers or tillers which control the beams with said cross-bar, and by providing a hand-lever to operate the cross-bar and foot-levers to operate the wheel-spindle, so as to manipulate the parts by hand or by foot. I regard the levers or tillers combined with the vertically-pivoted cultivating-beams, which they swing laterally, as broadly new, and I regard the general combination with these levers or tillers and their pivoted beams as also broadly new in the sense of a new structural arrangement, though the general idea of shifting the beams laterally and deflecting the wheels, as above indicated, is not at this time new.

My invention further consists of certain subordinate arrangements or combinations and of certain details of construction, which will be hereinafter fully described, and particularly pointed out in the claims.

In the accompanying drawings, on which like reference letters and figures indicate corresponding parts, Figure 1 is a plan view of a cultivator embodying my improvements; Fig. 2, a detail perspective view of one of the wheel-spindles, showing its arm and foot-lever. Fig. 3 is a vertical sectional view of the machine on the line $x$ $x$ of Fig. 1, looking in the direction of the arrow. Fig. 4 is a detail pespective view of a part of the wheel-deflecting and beam-shifting mechanism. Fig. 5 is a detail sectional view on the line $y$ $y$ of Fig. 6, showing the construction of the beam-pivot; Fig. 6, a detail perspective view of the same parts; Fig. 7, a perspective view of the same parts separated to more fully illustrate their construction; and Fig. 8, a perspective view further illustrating my invention, with parts broken away and others removed.

I have illustrated in the accompanying drawings my improvements as applied to one type of cultivator, being a form wherein a divided tongue or pole A is secured to an arched axle composed of a lower bar B and an upper bar C. To the latter bar is secured a toothed segment D, supporting with the bracket E a rock-shaft F, carrying a lever G, adapted to be locked by a detent H to said segment. On the rock-shaft F is an arm I, which guides a pressure-rod J, connected to the cultivator-beam, and through a spring K is adapted to apply yielding pressure downward on the beam for the usual purpose of making the shovels take into the soil. This mechanism enables the operator to lift the beams from the ground and lock them up also. This lifting and depressing mechanism is in duplicate, there being one such for each beam, as shown in Fig. 1. Another toothed segment L is carried by the bar C and supports a lever M, with a detent O to lock it to the segment. This lever, through a rod Q, is used to lock the beam against lateral movement in the manner hereinafter to appear. To the tongue is secured a cross-beam R, to which is attached the doubletree S, to which the draft-bars T are attached, and which have draft-rods U running back and connecting with the cultivator-beams in the manner shown in Fig. 3.

I will now refer to parts which enter into my improvements.

The letter $a$ designates the wheel-spindles, carrying stud-axles $b$, on which are mounted the wheels $c$. These spindles are pivoted, as shown, in the arched axle, and each spindle carries an arm $e$ and a foot-bar $f$. The latter receives the foot, so that while riding on the seat $g$ the operator can deflect the wheels out of the line of draft of the machine, so as to cause the general frame to draw over from one side to the other. To the arms $e$ is connected by suitable swivel-joints $h$ the cross-bar composed of parts $i$, overlapped at their inner ends, as shown in Fig. 4, and fitted to a casting $j$ and secured to each other and to the casting by a bolt $k$. This bolt also connects with these parts a hand-lever $l$, extending back, say, along the seat, as seen in Fig. 3, or to a convenient distance for an operator walking behind the machine. This lever $l$ is fulcrumed on a bolt $m$, carried by the arch, as seen in Fig. 3, and when vibrated at its rear end its forward end shifts the cross-bar $i$ sidewise and through the arms $e$ deflects the wheels on their vertical axes. Thus the wheels may be deflected either by foot or by hand, according as the operator is riding or walking.

Referring now to the means for shifting the beams laterally, 2 designates cast plates fitted each on the under side of the cross-beam R, near each end, and having a circular recess 3, adapted to receive the circular boss 4, extending from a bracket 5, carrying a rod 6, on which the forward ends of the beams or drag-bars 7 are hung. This bracket has a part 8 adapted to receive the lever or tiller 9, which is bolted thereto, as shown at 10. Two bolts 11, with a disk 12 fitted to a recess 13, serve to hold the bracket 5 in pivotal connection with the casting 2 and to secure such casting to the cross-beam R. Thus the forward ends of the beams or drag-bars are pivotally connected on a vertical axis to the frame, so that by shifting the rear ends of the levers or tillers 9 such beams, with their shovels, are laterally shifted. To effect such movements of the levers or tillers, I connect them by links 14 with a T-lever 15, pivoted on the bolt $k$, and thereby connected with the cross-bar $i$, so that when it is shifted laterally the T-lever 15, with the links 14, also shifts and so likewise shift the levers or tillers 9. The tillers have clips 16, which, together with the rear extremities of the tillers, form jaws that embrace the cross-bar $i$ to assist in guiding and supporting the rear ends of the tillers. Thus it will be seen that by operating the hand-lever $g$ or the foot-bars $f$ the wheels are deflected, and simultaneously therewith the levers 9 are vibrated, and through the brackets 8 the beams are turned on their forward pivots and their rear ends, with their shovels, shifted laterally. It will be observed, too, by inspecting the parts that if the wheels are turned to carry the frame to the left the rear of the beams will be shifted also to the left, and vice versa.

As a means of locking the wheels and beams against deflection and laterally shifting in cases where it is desired to so use the machine, I connect the rod Q with the third arm of the T-lever 15 and thus prevent the T-lever from swinging on its pivot, as it naturally does to some extent when its pivot (the bolt $k$) is shifted sidewise with the cross-bar $i$. This rod Q is controlled by the lever M and its detent and locking-segment. When the wheels and beams are not to be so locked, then the rod Q is disconnected from the T-lever 15. As above observed, I regard this feature of beams pivoted at or near their forward ends on vertical axes and levers or tillers arranged to vibrate laterally to so shift the beams as a new feature in cultivators, and which by experience I have ascertained to be effective and convenient in practice and in giving me a quick and yet positive control over the beams and their shovels. As also above observed, this feature, combined with the cross-bar and deflecting-wheels, constitutes a novel and valuable general combination which by experience I have ascertained is a successful and practical way of making this class of cultivators.

Having thus fully described my invention, what I claim as new, and desire to secure by Letters Patent, is—

1. In a cultivator, the combination with the main frame and its wheels swiveled thereto, arms connected to the wheel-spindles and a cross-bar interconnecting said arms, cultivator-beams pivoted to the frame, and levers or tillers on vertical pivots and connected to the beams at one end so as to turn them laterally on such pivots and to said cross-bar at the other, and manual means to laterally shift said cross-bar.

2. In a cultivator, the combination with a general frame, of wheels swiveled thereto, a cross-bar and arms connecting their spindles, cultivating-beams pivoted on vertical axes, levers or tillers on such axes and connected to said beams and to said cross-bar, and a hand-lever connected to said cross-bar to deflect the wheels, and to laterally shift the beams through said levers or tillers.

3. In a cultivator, the combination with the general frame, of wheels swiveled thereto, a cross-bar and arms connecting their spindles, cultivating-beams pivoted on vertical axes, levers or tillers on such axes and connected to said beams and to said cross-bar, and foot-bars connected to said wheel-spindles, to deflect the wheels, and to laterally shift the cultivating-beams through said levers or tillers, arms and cross-bar and intermediate connections.

4. In a cultivator, the combination with the main frame and its wheels swiveled thereto, arms connected to the spindles and a cross-bar interconnecting the arms, a lever connected to the cross-bar, tillers on vertical pivots and connected to said lever and cultivating-beams pivoted to the frame on such pivots and connected with said tillers, and manual means to shift said cross-bar and its attached lever laterally.

5. In a cultivator, the combination with the frame and its swiveled wheels, arms connected to the spindles, a cross-bar interconnecting said arms, a lever pivoted to the cross-bar, links connected to said lever, vertically-pivoted tillers connected to said links, vertically-pivoted cultivating-beams connected to said tillers, and a hand-lever pivoted to the frame and to the cross-bar.

6. In a cultivator, the combination with the frame and its wheels swiveled thereto, arms connected to the spindles, a cross-bar interconnecting said arms, a lever pivoted to the cross-bar, links pivoted to the lever, tillers vertically pivoted to the links and embracing the cross-bar, cultivating-beams connected to brackets vertically pivoted to the frame and connected to said tillers, and a hand-lever pivoted to the frame and connected to the cross-bar.

7. In a cultivator, the combination with the frame, of cultivating-beams vertically pivoted thereto and tillers connected to the beams and adapted to vibrate laterally, and means connected to said tillers to vibrate them.

8. In a cultivator, the combination with the frame and castings secured thereto, of a bracket vertically pivoted to each casting, and a cultivating-beam and a tiller connected to each bracket, and pivoting on such pivot a cross-bar, a hand-lever and another lever pivoted thereto, and links connecting said other lever with said tillers.

9. In a cultivator, the combination with the frame, its wheels swiveled thereto, arms connected to the spindles, a cross-bar interconnecting the arms, a T-lever pivoted to the cross-bar, a locking-lever connected to one arm of the T-lever, and means to lock said locking-lever, tillers connected at one end to the T-lever and at the other to the cultivating-beams, and a vertical pivot connecting each beam with the frame and tiller, and means to shift the cross-bar laterally when the T-lever is disengaged from the locking-lever.

In testimony whereof I affix my signature in presence of two witnesses.

HARRY E. DODSON.

Witnesses:
C. C. KIRKPATRICK,
CHAS. R. CRAIN.